(12) United States Patent
Zhao et al.

(10) Patent No.: US 12,483,757 B2
(45) Date of Patent: Nov. 25, 2025

(54) METHOD, APPARATUS, AND DEVICE FOR VIDEO-BASED INTERACTION, AND STORAGE MEDIUM

(71) Applicant: Beijing Zitiao Network Technology Co., Ltd., Beijing (CN)

(72) Inventors: Yu Zhao, Beijing (CN); Ji Li, Beijing (CN)

(73) Assignee: BEIJING ZITIAO NETWORK TECHNOLOGY CO., LTD., Beijing (CN)

(*) Notice: Subject to any disclaimer, the term of this patent is extended or adjusted under 35 U.S.C. 154(b) by 40 days.

(21) Appl. No.: 18/090,302

(22) Filed: Dec. 28, 2022

(65) Prior Publication Data

US 2023/0144966 A1 May 11, 2023

Related U.S. Application Data (63) Continuation of application No. PCT/CN2021/119541, filed on Sep. 22, 2021.

(30) Foreign Application Priority Data

Sep. 30, 2020 (CN) .......................... 202011065398.9

(51) Int. Cl.
  *H04N 21/472* (2011.01)
  *H04N 21/431* (2011.01)
(52) U.S. Cl.
  CPC ... *H04N 21/47217* (2013.01); *H04N 21/4312* (2013.01)
(58) Field of Classification Search
  CPC .............. H04N 21/47217; H04N 21/4312
  See application file for complete search history.

(56) References Cited

U.S. PATENT DOCUMENTS

2008/0276272 A1* 11/2008 Rajaraman ............ G06Q 30/02
  725/37
2009/0037947 A1  2/2009 Patil
  (Continued)

FOREIGN PATENT DOCUMENTS

CN  103607650 A  2/2014
CN  104469521 A  3/2015
  (Continued)

OTHER PUBLICATIONS

International Search Report and Written Opinion mailed Dec. 23, 2021, in related International Patent Application. PCT/CN2021/119541.

(Continued)

*Primary Examiner* — Sherrod L Keaton
(74) *Attorney, Agent, or Firm* — Astute IP Law Group (57) ABSTRACT

A method for video-based interaction method includes: when a target video is played back to a target time, determining whether a resource corresponding to a mask in the target video is successfully loaded, the resource comprising an interactive display image having a correlation with a target display element; if the resource is successfully loaded, assigning the interactive display image as a display image of an interactive control, displaying a mask comprising the interactive control on a current playback interface; and when a trigger operation with respect to the interactive control is received, skipping from the current playback interface to a target page, thus implementing the displaying of the target page. For the present solution, because the interactive control is related to a display element in a video image frame, a user can be immersively brought from the video playback interface to browsing the target page, thus ensuring user experience.

17 Claims, 5 Drawing Sheets

(56) References Cited

U.S. PATENT DOCUMENTS

| | | | |
|---|---|---|---|
| 2012/0084810 A1 | 4/2012 | Thompson et al. | |
| 2014/0013196 A1* | 1/2014 | White | H04N 21/4788 709/204 |
| 2015/0310126 A1* | 10/2015 | Steiner | G06F 16/9574 715/204 |
| 2019/0109920 A1 | 4/2019 | Li | |
| 2020/0128284 A1* | 4/2020 | Parks | H04N 21/858 |
| 2020/0245017 A1* | 7/2020 | Ganschow | H04N 21/4312 |
| 2020/0336804 A1* | 10/2020 | Cui | H04N 21/4781 |
| 2021/0367914 A1* | 11/2021 | Collins | G06F 16/489 |

FOREIGN PATENT DOCUMENTS

| | | |
|---|---|---|
| CN | 105635788 A | 6/2016 |
| CN | 107748690 A | 3/2018 |
| CN | 107870920 A | 4/2018 |
| CN | 103607650 B | 8/2018 |
| CN | 108769814 A | 11/2018 |
| CN | 109660873 A | 4/2019 |
| CN | 110062270 A | 7/2019 |
| CN | 111026392 A | 4/2020 |
| CN | 111263235 A | 6/2020 |
| CN | 111436004 A | 7/2020 |
| CN | 111669639 A | 9/2020 |
| JP | 2005210371 A | 8/2005 |
| JP | 2010526494 A | 7/2010 |
| WO | 2019228120 A1 | 12/2019 |

OTHER PUBLICATIONS

Office Action in CN202011065398.9, mailed Apr. 28, 2023, 15 pages.
Extended European Search Report in EP21874300.3, mailed Nov. 21, 2023, 10 pages.
Office Action in CN202011065398.9, mailed Nov. 4, 2023, 9 pages.
Office Action in JP2023-506176, mailed Feb. 13, 2024, 5 pages.

* cited by examiner

METHOD, APPARATUS, AND DEVICE FOR VIDEO-BASED INTERACTION, AND STORAGE MEDIUM

This application is a continuation of International Application No. PCT/CN2021/119541, filed on Sep. 22, 2021 which claims priority to Chinese application No. 202011065398.9, titled "VIDEO-BASED INTERACTION METHOD AND APPARATUS, DEVICE, AND STORAGE MEDIUM", filed Sep. 30, 2020, with the China National Intellectual Property Administration, the disclosures of which are incorporated herein by reference in their entireties.

FIELD

The present application relates to the field of data processing, and in particular to a video-based interaction method and apparatus, a device and a storage medium.

BACKGROUND

With the increasing number of users of the short video software, video-based interaction methods have attracted more and more attention.

On the premise of ensuring user experience, switching from a video play interface to a target page is a technical problem that needs to be solved urgently at present.

SUMMARY

In order to solve or at least partially solve the above-described technical problem, a video-based interaction method and apparatus, a device, and a storage medium are provided according to the present disclosure, which can realize the switching from the video play interface to the target page on the premise of ensuring user experience.

In a first aspect, a video-based interaction method is provided according to the present disclosure. The method includes:
  determining whether a resource corresponding to an obscuration in a target video is successfully loaded, in response to playing the target video to a target time instant, where the resource includes an interaction display image having a correspondence with a target display element on a current image frame corresponding to the target time instant;
  determining the interaction display image as a display image of an interaction control, in response to determining that the resource corresponding to the obscuration is successfully loaded; and displaying the obscuration including the interaction control, on a current play interface corresponding to the current image frame; and
  jumping from the current play interface to a target page in response to a trigger operation on the interaction control, where content presented on the target page corresponds to content presented on the current image frame.

In an optional implementation, after jumping from the current play interface to the target page, the method further includes:
  jumping from the target page to a video play interface in response to a return operation triggered on the target page, and continuing to play the target video on the video play interface based on a predetermined time instant, where the predetermined time instant is a play time instant later than the target time instant in the target video.

In an optional implementation, the resource further includes an interaction guidance animation, the interaction guidance animation includes at least two image frames, the interaction guidance animation is played on the obscuration, and the method further includes:
  storing a current play frame of the interaction guidance animation played on the obscuration as a target play frame, in response to a trigger operation of switching an application program corresponding to the target video to a background, and
  continuing to play the interaction guidance animation on the obscuration based on the target play frame, in response to a trigger operation of switching the application program to a foreground.

In an optional implementation, jumping from the current play interface to a target page in response to a trigger operation on the interaction control includes:
  jumping from the current play interface to the target page in a transition animation manner, in response to the trigger operation on the interaction control.

In an optional implementation, before jumping from the current play interface to a target page in a transition animation manner, the method further includes:
  pre-rendering the target page, to obtain a pre-rendered page, and
  sending an audio play identifier and a page display identifier to a control module of the target page, where the audio play identifier indicates whether to play an audio resource corresponding to the target page, the page display identifier indicates whether to display the pre-rendered page, and the control module is configured to play the audio resource based on the audio play identifier and display the pre-rendered page based on the page display identifier.

In an optional implementation, after determining whether the resource corresponding to the obscuration in the target video is successfully loaded, the method further includes:
  continuing to play the target video based on the target time instant, in response to determining that the resource corresponding to the obscuration fails to load.

In an optional implementation, determining the interaction display image as the display image of the interaction control; and displaying the obscuration including the interaction control, on the current display interface corresponding to the current image frame includes:
  determining target display position information of the interaction display image on a screen of a current device, based on a screen size of the current device and display position information of the interaction display image in the target video, and
  displaying the obscuration on the current play interface corresponding to the current image frame, and displaying the interaction control on the obscuration based on the target display position information, where the interaction display image is used as the display image of the interaction control.

In a second aspect, a video-based interaction apparatus is provided according to the present disclosure. The apparatus includes:
  a determining module configured to determine whether a resource corresponding to an obscuration in a target video is successfully loaded, in response to playing the target video to a target time instant, where the resource includes an interaction display image having a correspondence with a target display element on a current image frame corresponding to the target time instant, a displaying module configured to determine the interaction display image as a display image of an interaction control, in response to determining that the resource corresponding to the obscuration is successfully loaded; and display the obscuration including the interaction control, on a current play interface corresponding to the current image frame; and a jumping module configured to jump from the current play interface to a target page in response to a trigger operation on the interaction control, where content presented on the target page corresponds to content presented on the current image frame.

In a third aspect, a computer readable storage medium is provided according to the present disclosure, where instructions are stored on the computer readable storage medium, and the instructions, when executed by a terminal device, cause the terminal device to implement the above method.

In a fourth aspect, a device is provided according to the present disclosure, which includes a memory, a processor, and a computer program stored on the memory and executable on the processor, where the processor, when executing the computer program, implements the above method.

The technical solutions according to embodiments of the present disclosure have the following advantages over the conventional technology.

In a video-based interaction method is provided according to the embodiments of the present disclosure, it is determined whether a resource corresponding to an obscuration in a target video is successfully loaded, in response to playing the target video to a target time instant. The resource corresponding to the obscuration includes an interaction display image having a correspondence with a target display element on a current image frame corresponding to the target time instant. If it is determined that the resource corresponding to the obscuration is successfully loaded, the interaction display image is determined as a display image of the interaction control, and the obscuration including the interaction control is displayed on a current play interface corresponding to the current image frame. When a trigger operation on the interaction control is received, jumping from the current play interface to the target page is performed, to display the target page.

Thus, the obscuration including the interaction control is displayed on the video play interface according to the embodiments of the present disclosure, and the target page is jumped to by the interaction control, to display the target page. In addition, the setting of the interaction control is related to the display element in the video image frame. Thus, a user can be led in an immersive manner from the video play interface to browsing of the target page according to the embodiments of the present disclosure, thereby guaranteeing user experience.

BRIEF DESCRIPTION OF THE DRAWINGS

The accompanying drawings, which are incorporated in and constitute a part of this specification, illustrate embodiments consistent with the disclosure and together with the description serve to explain the principles of the disclosure.

In order to more clearly illustrate the embodiments of the present disclosure or the technical solutions in the conventional technology, the accompanying drawings for description of the embodiments or the conventional technology are briefly introduced below. Apparently, other drawings can also be obtained from these drawings by those of ordinary skills in the art without any inventive efforts.

DETAILED DESCRIPTION OF EMBODIMENTS

In order to more clearly understand the above objects, features and advantages of the present disclosure, the solutions of the present disclosure are further described below. It should be noted that the embodiments of the present disclosure and the features in the embodiments may be combined with each other under the condition of no conflict therebetween.

Many specific details are set forth in the following description to facilitate a full understanding of the present disclosure, while the present disclosure can also be implemented in other ways different from those described herein. Apparently, the embodiments in the specification are only some rather than all of the embodiments of the present disclosure.

With the increasing number of users of the short video software, how to ensure the user experience in short video software has attracted more and more attention from developers. The video-based interaction method is one of the important factors to ensure the user experience of short video software. Therefore, the video-based interaction method has also attracted much attention.

To this end, a video-based interaction method is provided according to the present disclosure. In the method, it is determined whether a resource corresponding to an obscuration in a target video is successfully loaded, in response to playing the target video to a target time instant. If the resource is successfully loaded, an interaction display image in the resource, which has a correspondence with a target display element on a current image frame corresponding to the target time instant, is determined as a display image of the interaction control. The obscuration including the interaction control is displayed on a current play interface. When a trigger operation on the interaction control is received, jumping from the current play interface to a target page having a correspondence with content presented on the current image frame is performed, to display the target page.

According to the embodiments of the present disclosure, the obscuration including the interaction control is displayed on the video play interface when the target video is played to the target time instant, and jumping from the current play page to the target page is performed when a trigger operation on the interaction control is received, to display the target page. Thus, the video play interface is switched to the target page to be presented, according to the embodiments of the present disclosure.

In addition, in the embodiments of the present disclosure, the display of the interaction control is correlated with original display content on an image frame of the target video. Thus, a user can be led in an immersive manner from the video play interface to browsing of the target page according to the embodiments of the present disclosure, thereby guaranteeing user experience.

Figure 1:
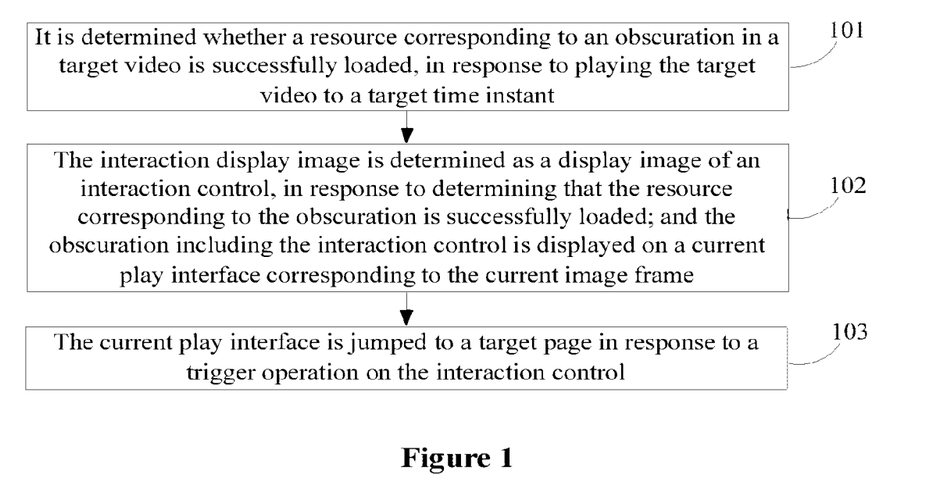
FIG. 1 is a flowchart of a video-based interaction method according to an embodiment of the present disclosure.

On this basis, a video-based interaction method is provided according to an embodiment of the present disclosure. FIG. 1 is a flowchart of a video-based interaction method according to an embodiment of the present disclosure. Referring to FIG. 1, the method includes S101 to S103.

In S101, it is determined whether a resource corresponding to an obscuration in a target video is successfully loaded, in response to playing the target video to a target time instant.

The resource includes an interaction display image having a correspondence with a target display element on a current image frame corresponding to the target time instant.

In an embodiment of the present disclosure, the target video is a video segment with a certain play duration, for example, an interactive advertisement video. Specifically, one or more image frames next to an image frame corresponding to the target time instant in the target video are used to display the obscuration. The target time instant is a play time instant which is set based on display requirements of the obscuration. For example, image frames at play time instants from the fifth second to the seventh second in the target video are used to display the obscuration. Thus, the target time instant is the fifth second.

The successful load of the resource corresponding to the obscuration in the target video determines a successful display of the obscuration. Therefore, in order to guarantee successful display of the obscuration in the embodiment of the present disclosure, it is first determined whether the resource corresponding to the obscuration in the target video is successfully loaded, before the obscuration is displayed. The obscuration is displayed if the load is successful; otherwise, the obscuration is not displayed and the target video is continued to be played.

Figure 2:
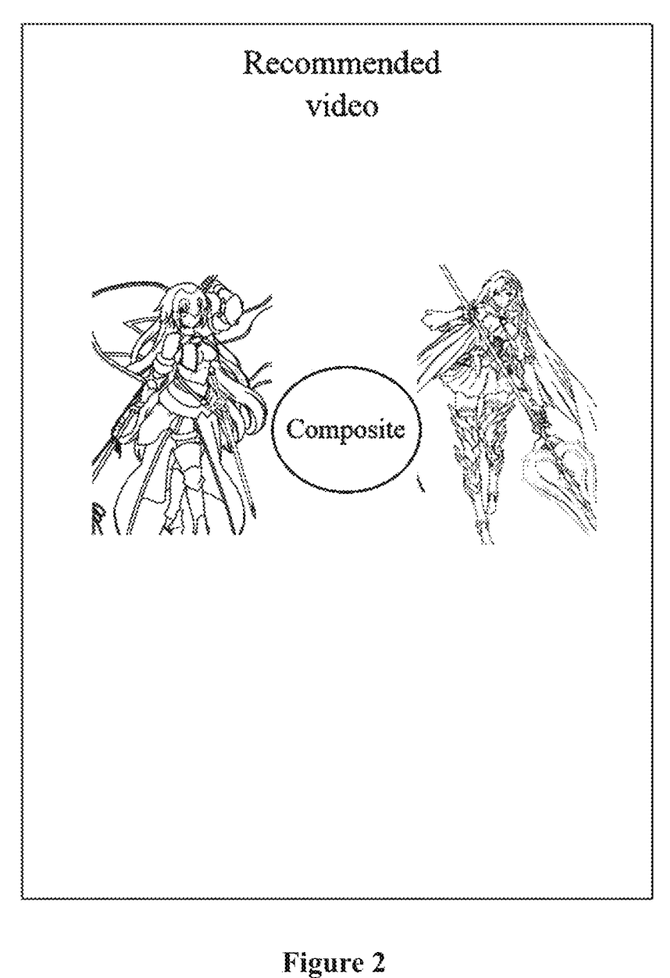
FIG. 2 is a schematic diagram of a current image frame corresponding to a target time instant according to an embodiment of the present disclosure.

In practice, in a playing process of the target video, it is determined whether the resource corresponding to the obscuration in the target video is successfully loaded, when the target video is played to the target time instant. The resource corresponding to the obscuration may include an interaction display image or an audio resource, where the interaction display image has a correspondence with a target display element on a current image frame corresponding to the target time instant in the target video. FIG. 2 is a schematic diagram of a current image frame corresponding to a target time instant according to an embodiment of the present disclosure. Referring to FIG. 2, an image corresponding to "Composite" is a target display image, and the interaction display image may be an image which may be the same as or similar to the target display image. The audio resource may be a background music for presenting the obscuration.

In an optional implementation, it may be determined whether the target video includes an obscuration, when the playback of the target video is started. If it is determined that the target video includes the obscuration, a resource corresponding to the obscuration is pre-loaded, to guarantee the successful display of the obscuration. Specifically, the resource corresponding to the obscuration may be downloaded from a server based a resource link.

In S102, the interaction display image is determined as a display image of an interaction control, in response to determining that the resource corresponding to the obscuration is successfully loaded; and the obscuration including the interaction control is displayed on a current play interface corresponding to the current image frame.

In an embodiment of the present disclosure, the obscuration may be displayed based on the current image frame corresponding to the target time instant, if it is determined that the resource corresponding to the obscuration is successfully loaded. If it is determined that the resource corresponding to the obscuration fails to load, the target video may be played normally, rather than be paused.

The resource corresponding to the obscuration being successfully loaded indicates that all resource corresponding to the obscuration is loaded, and the resource corresponding to the obscuration failing to load indicates that at least one resource corresponding to the obscuration is not loaded.

In practice, when the target video is played to the target time instant, the interaction display image successfully loaded is determined as the display image of the interaction control if it is determined that the resource corresponding to the obscuration is successfully loaded, the obscuration including the interaction control is displayed on the current play interface corresponding to the current image frame. An interaction interface is presented for the user based on the display of the obscuration.

In an embodiment of the present disclosure, display position information of the interaction control displayed on the obscuration is determined based on display position information of the target display element corresponding to the interaction display image on the current image frame.

In an optional implementation, the display position information of the interaction display image in the target video is pre-loaded. Specifically, in order to ensure the successful display of the obscuration, the display position information of the interaction display image in the target video is first downloaded from a server before the obscuration is displayed. Specifically, the display position information is position information and size information of the interaction display image with respect to the target video.

In order that the loaded interaction display image can be accurately displayed on a screen of a current device, before the obscuration is displayed, a screen size of the current device and the display position information of the interaction display image in the target video are first obtained. Then, target display position information of the interaction display image in the screen of the current device is then determined based on the screen size of the current device and the display position information of the interaction display image in the target video. Finally, the interaction control is displayed on the obscuration of the current play interface based on the target display position information. Specifically, the display image on the interaction control is the loaded interaction display image.

Figure 3:
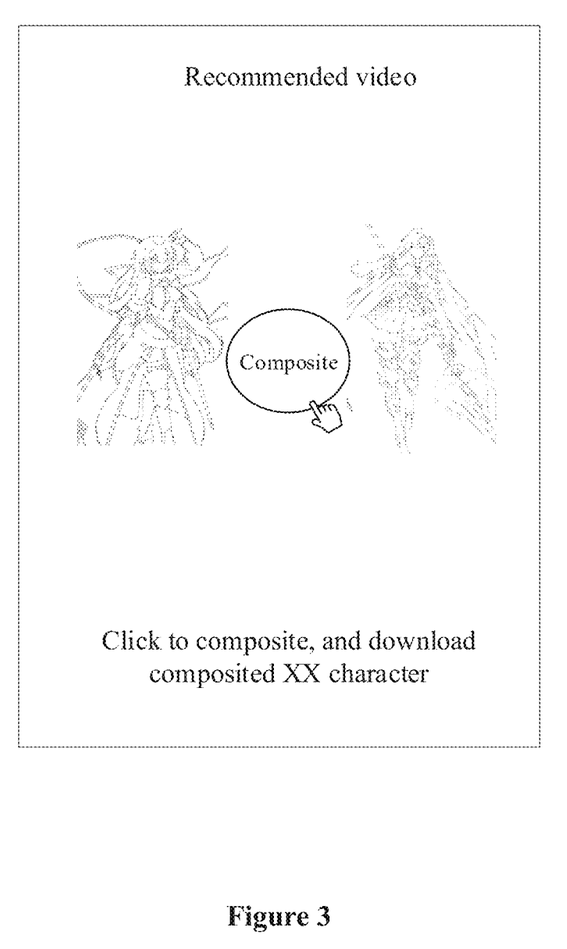
FIG. 3 is a rendering drawing of an interface of an obscuration including an interaction control according to an embodiment of the present disclosure.

FIG. 3 is a rendering drawing of an obscuration including an interaction control according to an embodiment of the present disclosure. As shown in FIG. 3, the display image of the interaction control is the same as an image corresponding to "Composite" in FIG. 2.

In S103, the current play interface is jumped to a target page in response to a trigger operation on the interaction control.

Content presented on the target page corresponds to content presented on the current image frame.

In an embodiment of the present disclosure, jumping from the current play interface to the target page is performed in response to a trigger operation on the interaction control displayed on the obscuration, to display the target page.

Specifically, content presented on the target page may be correlated with content presented on the current image frame corresponding to the target time instant, which may be an advertisement page corresponding to the content presented on the current image frame for example.

In the video-based interaction method according to the embodiments of the present disclosure, it is determined whether resource corresponding to an obscuration in a target video is successfully loaded, when the target video is played to a target time instant. If the resource is successfully loaded, an interaction display image in the resource, which has a correspondence with a target display element on a current image frame corresponding to the target time instant, is determined as a display image of the interaction control. The obscuration including the interaction control is displayed on a current play interface. When a trigger operation on the interaction control is received, jumping from the current play interface to a target page having a correspondence with content presented on the current image frame is performed, to display the target page.

According to the embodiments of the present disclosure, the obscuration including the interaction control is displayed on the video play interface when the target video is played to the target time instant. Jumping from the current play interface to the target page is performed when a trigger operation on the interaction control is received, to display the target page. Thus, a function for switching from the video play interface to the target page can be achieved to display the target page according to the embodiments of the present disclosure.

In addition, in the embodiments of the present disclosure the display of the interaction control is correlated with original display content on an image frame of the target video. Thus, a user can be led in an immersive manner from the video play interface to browsing of the target page according to the embodiments of the present disclosure, thereby guaranteeing user experience.

Figure 4:
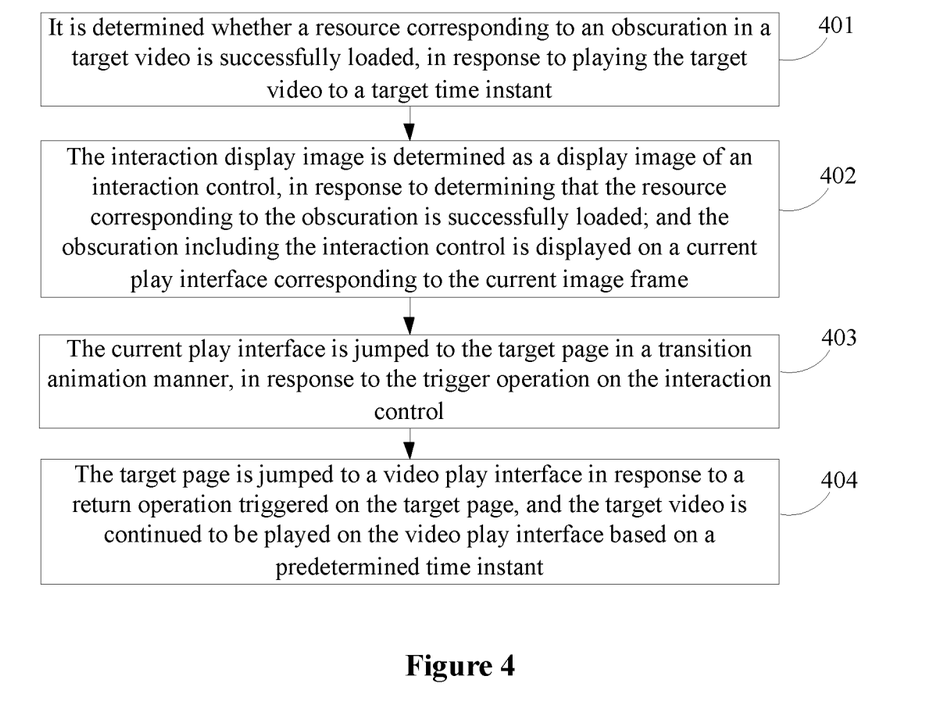
FIG. 4 is a flowchart of a video-based interaction method according to another embodiment of the present disclosure.

In order to improve the user experience, based on the above embodiments, another video-based interaction method is further provided according to an embodiment of the present disclosure. FIG. 4 is a flowchart of a video-based interaction method according to another embodiment of the present disclosure. Referring to FIG. 4, the method includes steps S401 to S404.

In S401, it is determined whether a resource corresponding to an obscuration in a target video is successfully loaded, in response to playing the target video to a target time instant.

The resource includes an interaction display image having a correspondence with a target display element on a current image frame corresponding to the target time instant.

In S402 the interaction display image is determined as a display image of an interaction control, in response to determining that the resource corresponding to the obscuration is successfully loaded; and the obscuration including the interaction control is displayed on a current play interface corresponding to the current image frame.

Reference may be made to the steps S101 and S102 in the above embodiment for understanding the steps S401 and S402 in this embodiment, which will not be repeated herein.

In addition, when the obscuration including the interaction control is displayed on the current play interface, an interaction guidance animation may be displayed, to guide the user to trigger the interaction control by a corresponding operation. As shown in FIG. 3, the interaction guidance animation is used to guide the user to click the interaction control "Composite", to perform a trigger operation on the interaction control.

In practice, when the obscuration on which the interaction guidance animation is being played is displayed on the current play interface, if the user switches an application program corresponding to the target video to background and then switches it from background to foreground, the interaction guidance animation played on the obscuration cannot be continued to be played based on a state before the switching, thereby degrading the user experience.

In view of this, if the interaction guidance animation is being played on the obscuration, a currently play frame of the interaction guidance animation played on the obscuration is stored as a target play frame, in response to a trigger operation of switching the application program corresponding to the target video to background. Then, the application program corresponding to the target video is switched to background running.

The target play frame is obtained when a trigger operation of switching the application program from background to foreground is received. The interaction guidance animation is continued to be played on the obscuration based on the target play frame. For example, the target play frame is the second frame, and the interaction guidance animation is continued to be played from the third frame of the interaction guidance animation when the application program is switched back to foreground. In this way, the user can perform interaction with the obscuration based on a display state of the obscuration before the switching to background, thereby improving user experience.

In S403, the current play interface is jumped to the target page in a transition animation manner, in response to the trigger operation on the interaction control.

In an embodiment of the present disclosure, when the trigger operation on the interaction control is received, the current play interface may be jumped to the target page in the transition animation manner. As a user can be guided to the target page in an initial video dynamic manner by the transition animation manner, user experience is guaranteed in the processing of page jumping.

In an optional implementation, a resource of the target page is pre-rendered, to avoid situations of blank screen or loading state in the process of jumping to the target page in the transition animation manner. Specifically, before jumping to the target page, the target page is pre-rendered first to obtain a pre-rendered page. At this time, the pre-rendered page is not displayed on the target page. When the trigger operation on the interaction control is detected, the pre-rendered page is displayed on the target page in the transition animation manner, to achieve the effect of jumping from the current play interface to the target page.

In practice, the target page may include an audio resource, such as a background music. After the target page is pre-rendered, the background music has been played before the target page is displayed, in the process of jumping to the target page in the transition animation manner. In view of this, an audio play identifier and a page display identifier are transmitted to a control module of the target page in an embodiment of the present disclosure, to control a play timing of the audio resource such as the background music on the target page and a display timing of the content on the target page. Specifically, the audio play identifier indicates whether to play the audio resource corresponding to the target page, the page display identifier indicates whether to display the pre-rendered page, and the control module is configured to play the audio resource based on the audio play identifier and display the pre-rendered page based on the page display identifier.

In an embodiment of the present disclosure, the audio play identifier and the page display identifier are transmitted to the control module through a notification message, which can effectively control the play timing of the audio resource such as the background music on the target page and the display timing of the content on the target page, thereby avoiding the situation that the background music has been played before the target page is displayed, and improving user experience.

In S404, the target page is jumped to a video play interface in response to a return operation triggered on the target page, and the target video is continued to be played on the video play interface based on a predetermined time instant.

The predetermined time instant is a play time instant later than the target time instant in the target video.

In an embodiment of the present disclosure, in a display process of the target page, if a user triggers a return operation on the target page, jumping from the target page to the video play interface is performed, and the target video is continued to be played on the video play interface based on the predetermined time instant.

Specifically, the predetermined time instant may be configuration data loaded from a server, which may specifically be a play time instant later than the target time instant in the target video. For example, the predetermined time instant may be a time instant next to the target time instant in the target video.

In an optional implementation, in the display process of the obscuration, the target video may be continued to be played based on the predetermined time instant if the user does not click the interaction control within a predetermined time.

In another optional implementation, in the display process of the obscuration, the user may proactively trigger continuous play of the target video. Specifically, the target video is continued to be played based on the predetermined time instant, when a continuous play operation triggered by the user on the obscuration on the current play interface is received.

In the video-based interaction method according to the embodiments of the present disclosure, it is determined whether a resource corresponding to an obscuration in a target video is successfully loaded, in response to playing the target video to a target time instant. If the resource is successfully loaded, an interaction display image in the resource, which has a correspondence with a target display element on a current image frame corresponding to the target time instant, is determined as a display image of the interaction control. The obscuration including the interaction control is displayed on a current play interface. When a trigger operation on the interaction control is received, jumping from the current play interface to a target page having a correspondence with content presented on the current image frame is performed in a transition animation manner, to display the target page. Thus, a function for switching from the video play interface to the target page is achieved to display the target page, with user experience guaranteed according to the embodiments of the present disclosure.

In addition, the jumping to the target page is performed in the transition animation manner according to the embodiments of the present disclosure, thereby guiding the user to browsing of the target page in an initial video dynamic manner and guaranteeing user experience in the page jumping process.

Figure 5:
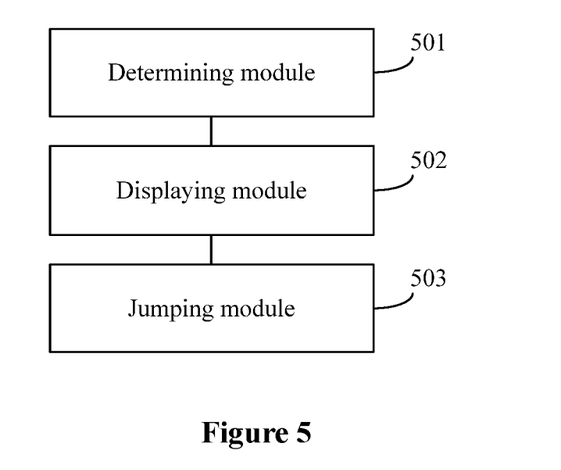
FIG. 5 is a structural diagram of a video-based interaction apparatus according to an embodiment of the present disclosure.

Based on the same inventive idea as the above method embodiments, a video-based interaction apparatus is further provided according to the present disclosure. FIG. 5 is a structural diagram of a video-based interaction apparatus according to an embodiment of the present disclosure. Referring FIG. 5, the apparatus includes: a determining module 501, a displaying module 502, and a jumping module 503.

The determining module 501 is configured to determine whether a resource corresponding to an obscuration in the target video is successfully loaded, in response to playing the target video to a target time instant, where the resource includes an interaction display image having a correspondence with a target display element on a current image frame corresponding to the target time instant.

The displaying module 502 is configured to determine the interaction display image as a display image of an interaction control, in response to determining that the resource corresponding to the obscuration is successfully loaded; and display the obscuration including the interaction control, on a current play interface corresponding to the current image frame.

The jumping module 503 is configured to jump from the current play interface to a target page in response to a trigger operation on the interaction control, where content presented on the target page corresponds to content presented on the current image frame.

In an optional implementation, the apparatus further includes: a returning module configured to jump from the target page to a video play interface in response to a return operation triggered on the target page, after jumping from the current play interface to the target page; and continue to play the target video on the video play interface based on a predetermined time instant, where the predetermined time instant is a play time instant later than the target time instant in the target video.

In an optional implementation, the resource further includes an interaction guidance animation, the interaction guidance animation includes at least two image frames, the interaction guidance animation is played on the obscuration, and the apparatus further includes: a storing module and a continuous playing module.

The storing module is configured to store a current play frame of the interaction guidance animation played on the obscuration as a target play frame, in response to a trigger operation of switching an application program corresponding to the target video to a background.

The continuous playing module is configured to continue to play the interaction guidance animation on the obscuration based on the target play frame, in response to a trigger operation of switching the application program to a foreground.

In an optional implementation, the jumping module is specifically configured to: jump from the current play interface to the target page in a transition animation manner, in response to the trigger operation on the interaction control.

In an optional implementation, the apparatus further includes: a pre-rendering module and a sending module.

The pre-rendering module is configured to pre-render the target page to obtain a pre-rendered page, before jumping from the current play interface to the target page in the transition animation manner.

The sending module is configured to send an audio play identifier and a page display identifier to a control module to the target page, where the audio play identifier indicates whether to play an audio resource corresponding to the target page, the page display identifier indicates whether to display the pre-rendered page, and the control module is configured to play the audio resource based on the audio play identifier and display the pre-rendered page based on the page display identifier.

In an optional implementation, the apparatus further includes: a video playing module configured to continue to play the target video based on the target time instant, in response to determining that the resource corresponding to the obscuration fails to load, after determining whether the resource corresponding to the obscuration in the target video is successfully loaded.

In an optional implementation, the displaying module includes: a determining sub-module and a displaying sub-module, The determining sub-module is configured to determine target display position information of the interaction display image on a screen of a current device, based on a screen size of the current device and display position information of the interaction display image in the target video.

The displaying sub-module is configured to display the obscuration on the current play interface corresponding to the current image frame, and display the interaction control on the obscuration based on the target display position information, where the interaction display image is used as the display image of the interaction control.

With the video-based interaction apparatus according to the embodiments of the present disclosure, it is determined whether a resource corresponding to an obscuration in a target video is successfully loaded, in response to playing the target video to a target time instant. If the resource is successfully loaded, an interaction display image in the resource, which has a correspondence with a target display element on a current image frame corresponding to the target time instant, is determined as a display image of the interaction control. The obscuration including the interaction control is displayed on a current play interface. When a trigger operation on the interaction control is received, the current play interface is jumped to a target page having a correspondence with content presented on the current image frame is performed, to display the target page.

According to the embodiments of the present disclosure, the obscuration including the interaction control is displayed on the video play interface when the target video is played to the target time instant, and the current play interface is jumped to the target page when a trigger operation on the interaction control is received, to display the target page. Thus, a function for switching from the video play interface to the target page can be achieved to display the target page, according to the embodiments of the present disclosure.

In addition, as the display of the interaction control is correlated with original display content on an image frame of the target video according to the embodiments of the present disclosure, a user can be led in an immersive manner from the video play interface to browsing of the target page according to the embodiments of the present disclosure, thereby guaranteeing user experience.

In addition to the above method and apparatus, a computer readable storage medium is further provided according to an embodiment of the present disclosure, where instructions are stored on the computer readable storage medium; and the instructions, when executed by a terminal device, cause the terminal device to implement the video-based interaction method according to the above embodiments of the present disclosure.

Figure 6:
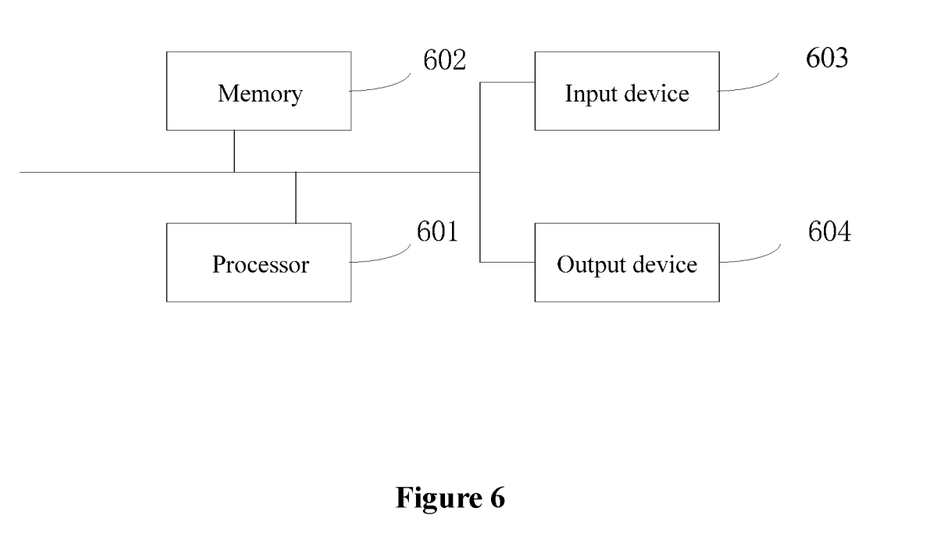
FIG. 6 is a structural diagram of a video-based interaction device according to an embodiment of the present disclosure.

In addition, a video-based interaction device is further provided according to an embodiment of the present disclosure. As shown in FIG. 6, the video-based interaction device may include: a processor 601, a memory 602, an input device 603 and an output device 604.

The number of processors 601 in the video-based interaction device may be one or more, and one processor is taken as an example in FIG. 6. In some embodiments of the present disclosure, the processor 601, the memory 602, the input device 603, and the output device 604 may be connected by a bus or in other ways, where the connection through the bus is taken as an example in FIG. 6.

The memory 602 can be used to store software programs and modules, and the processor 601 executes various functional applications and data processing of the video processing device by running the software programs and modules stored in the memory 602. The memory 602 may mainly include a program storage area and a data storage area, where the program storage area may store an operating system, and an application program for at least one function. Additionally, the memory 602 may include a high-speed random access memory, and may also include a non-volatile memory, such as at least one magnetic disk storage device, flash memory device, or other volatile solid state storage device. The input device 603 may be used to receive input numerical or character information, and to generate signal input related to user settings and functional control of the video processing device.

Specifically in this embodiment, the processor 601 loads the executable files corresponding to the processes of one or more application programs into the memory 602 according to the following instructions, and execute the application programs stored in the memory 602, so as to realize various functions of the above-described video processing device.

It should be noted that, in this disclosure, relational terms such as "first" and "second" etc. are only used to distinguish one entity or operation from another entity or operation, and do not necessarily require or imply there is such an actual relationship or sequence between these entities or operations. Moreover, the terms "include", "comprise" or any other variation thereof are intended to encompass non-exclusive inclusion such that a process, method, article or device including a list of elements includes not only those elements, but also includes other elements not explicitly listed or elements inherent to such a process, method, article or device. Without further limitation, an element preceded by the statement "comprising a . . . " does not preclude the presence of additional identical elements in a process, method, article or device that includes the element.

The above-described are only some specific embodiments of the present disclosure, so that those skilled in the art can understand or implement the present disclosure. Various modifications to these embodiments will be readily apparent to those skilled in the art, and the generic principles defined herein may be implemented in other embodiments without departing from the spirit or scope of the present disclosure. Therefore, the present disclosure is not limited to the embodiments described herein, but is to be accorded the widest scope consistent with the principles and novel features disclosed herein.

The invention claimed is:

1. A video-based interaction method, comprising:
determining whether an obscuration in a target video is successfully loaded, in response to playing the target video to a target time instant, wherein the obscuration comprises a resource, and the resource comprises an interaction display image having a correspondence with a target display element on a current image frame corresponding to the target time instant, and wherein the interaction display image is identical or similar to an image of the target display element;

determining the interaction display image as a display image of an interaction control, in response to determining that the obscuration is successfully loaded;

displaying the obscuration comprising the interaction control, on a current play interface corresponding to the current image frame, wherein the target display element on the current image frame is covered with the interaction control having the interaction display image identical or similar to the image of the target display element; and jumping from the current play interface to a target page in response to a trigger operation on the interaction control, wherein content presented on the target page corresponds to content presented on the current image frame;

wherein the resource further comprises an interaction guidance animation, the interaction guidance animation comprises at least two image frames, the interaction guidance animation is played on the obscuration, and the method further comprises:

storing a current play frame of the interaction guidance animation played on the obscuration as a target play frame, in response to a trigger operation of switching an application program corresponding to the target video to a background; and continuing to play the interaction guidance animation on the obscuration based on the target play frame, in response to a trigger operation of switching the application program to a foreground.

2. The method according to claim 1, wherein after jumping from the current play interface to the target page, the method further comprises:

jumping from the target page to a video play interface in response to a return operation triggered on the target page, and continuing to play the target video on the video play interface based on a predetermined time instant, wherein the predetermined time instant is a play time instant later than the target time instant in the target video.

3. The method according to claim 1, wherein jumping from the current play interface to the target page in response to a trigger operation on the interaction control comprises:

jumping from the current play interface to the target page in a transition animation manner, in response to the trigger operation on the interaction control.

4. The method according to claim 3, wherein before jumping from the current play interface to the target page through the transition animation manner, the method further comprises:

pre-rendering the target page, to obtain a pre-rendered page; and sending an audio play identifier and a page display identifier to a control module of the target page, wherein the audio play identifier indicates whether to play an audio resource corresponding to the target page, the page display identifier indicates whether to display the pre-rendered page, and the control module is configured to play the audio resource based on the audio play identifier and display the pre-rendered page based on the page display identifier.

5. The method according to claim 1, wherein after determining whether the obscuration in the target video is successfully loaded, the method further comprises:

continuing to play the target video based on the target time instant, in response to determining that the resource corresponding to the obscuration fails to load.

6. The method according to claim 1, wherein determining the interaction display image as the display image of the interaction control; and displaying the obscuration including the interaction control, on the current display interface corresponding to the current image frame comprises:

determining target display position information of the interaction display image on a screen of a current device, based on a screen size of the current device and display position information of the interaction display image in the target video; and displaying the obscuration on the current play interface corresponding to the current image frame, and displaying the interaction control on the obscuration based on the target display position information, where the interaction display image is used as the display image of the interaction control.

7. A non-transitory computer readable storage medium, wherein instructions are stored on the computer readable storage medium; and the instructions, when executed on a terminal device, cause the terminal device to:

determine whether an obscuration in a target video is successfully loaded, in response to playing the target video to a target time instant, wherein the obscuration comprises a resource, and the resource comprises an interaction display image having a correspondence with a target display element on a current image frame corresponding to the target time instant, and wherein the interaction display image is identical or similar to an image of the target display element;

determine the interaction display image as a display image of an interaction control, in response to determining that the obscuration is successfully loaded;

display the obscuration comprising the interaction control, on a current play interface corresponding to the current image frame, wherein the target display element on the current image frame is covered with the interaction control having the interaction display image identical or similar to the image of the target display element; and jump from the current play interface to a target page in response to a trigger operation on the interaction control, wherein content presented on the target page corresponds to content presented on the current image frame;

wherein the resource further comprises an interaction guidance animation, the interaction guidance animation comprises at least two image frames, the interaction guidance animation is played on the obscuration, and wherein the instructions, when executed on a terminal device, cause the terminal device to:

store a current play frame of the interaction guidance animation played on the obscuration as a target play frame, in response to a trigger operation of switching an application program corresponding to the target video to a background; and continue to play the interaction guidance animation on the obscuration based on the target play frame, in response to a trigger operation of switching the application program to a foreground.

8. The non-transitory computer readable storage medium according to claim 7, wherein the instructions, when executed on a terminal device, cause the terminal device to:

jump from the target page to a video play interface in response to a return operation triggered on the target page, and continue to play the target video on the video play interface based on a predetermined time instant, wherein the predetermined time instant is a play time instant later than the target time instant in the target video.

9. The non-transitory computer readable storage medium according to claim 7, wherein the instructions, when executed on a terminal device, cause the terminal device to:
jump from the current play interface to the target page in a transition animation manner, in response to the trigger operation on the interaction control.

10. The non-transitory computer readable storage medium according to claim 9, wherein the instructions, when executed on a terminal device, cause the terminal device to:
pre-render the target page, to obtain a pre-rendered page; and
send an audio play identifier and a page display identifier to a control module of the target page, wherein the audio play identifier indicates whether to play an audio resource corresponding to the target page, the page display identifier indicates whether to display the pre-rendered page, and the control module is configured to play the audio resource based on the audio play identifier and display the pre-rendered page based on the page display identifier.

11. The non-transitory computer readable storage medium according to claim 7, wherein the instructions, when executed on a terminal device, cause the terminal device to:
continue to play the target video based on the target time instant, in response to determining that the resource corresponding to the obscuration fails to load.

12. A device, comprising:
a memory;
a processor; and
a computer program stored on the memory and executable on the processor,
wherein the processor, when executing the computer program, implements a video-based interaction method, and the video-based interaction method comprises:
determining whether an obscuration in a target video is successfully loaded, in response to playing the target video to a target time instant, wherein the obscuration comprises a resource, and the resource comprises an interaction display image having a correspondence with a target display element on a current image frame corresponding to the target time instant, and wherein the interaction display image is identical or similar to an image of the target display element;
determining the interaction display image as a display image of an interaction control, in response to determining that the obscuration is successfully loaded;
displaying the obscuration comprising the interaction control, on a current play interface corresponding to the current image frame, wherein the target display element on the current image frame is covered with the interaction control having the interaction display image identical or similar to the image of the target display element; and
jumping from the current play interface to a target page in response to a trigger operation on the interaction control, wherein content presented on the target page corresponds to content presented on the current image frame;
wherein the resource further comprises an interaction guidance animation, the interaction guidance animation comprises at least two image frames, the interaction guidance animation is played on the obscuration, and the method further comprises:
storing a current play frame of the interaction guidance animation played on the obscuration as a target play frame, in response to a trigger operation of switching an application program corresponding to the target video to a background; and
continuing to play the interaction guidance animation on the obscuration based on the target play frame, in response to a trigger operation of switching the application program to a foreground.

13. The device according to claim 12, wherein after jumping from the current play interface to the target page, the method further comprises:
jumping from the target page to a video play interface in response to a return operation triggered on the target page, and continuing to play the target video on the video play interface based on a predetermined time instant, wherein the predetermined time instant is a play time instant later than the target time instant in the target video.

14. The device according to claim 12, wherein the jumping from the current play interface to a target page in response to a trigger operation on the interaction control comprises:
jumping from the current play interface to the target page in a transition animation manner, in response to the trigger operation on the interaction control.

15. The device according to claim 14, wherein before jumping from the current play interface to the target page through the transition animation manner, the method further comprises:
pre-rendering the target page, to obtain a pre-rendered page; and
sending an audio play identifier and a page display identifier to a control module of the target page, wherein the audio play identifier indicates whether to play an audio resource corresponding to the target page, the page display identifier indicates whether to display the pre-rendered page, and the control module is configured to play the audio resource based on the audio play identifier and display the pre-rendered page based on the page display identifier.

16. The device according to claim 12, wherein after determining whether the obscuration in the target video is successfully loaded, the method further comprises:
continuing to play the target video based on the target time instant, in response to determining that the resource corresponding to the obscuration fails to load.

17. The device according to claim 12, wherein determining the interaction display image as the display image of the interaction control; and displaying the obscuration including the interaction control, on the current display interface corresponding to the current image frame comprises:
determining target display position information of the interaction display image on a screen of a current device, based on a screen size of the current device and display position information of the interaction display image in the target video; and
displaying the obscuration on the current play interface corresponding to the current image frame, and displaying the interaction control on the obscuration based on the target display position information, where the interaction display image is used as the display image of the interaction control.

* * * * *